Oct. 25, 1960 T. G. MARSHALL, JR 2,958,003

SWEEP CIRCUIT

Filed Jan. 31, 1958

INVENTOR.
THOMAS G. MARSHALL, JR.
BY J. C. Whittaker
ATTORNEY

United States Patent Office 2,958,003
Patented Oct. 25, 1960

2,958,003

SWEEP CIRCUIT

Thomas G. Marshall, Jr., Franklin Park, N.J., assignor to Radio Corporation of America, a corporation of Delaware Filed Jan. 31, 1958, Ser. No. 712,380

14 Claims. (Cl. 315—27)

The present invention relates to an improved circuit for producing a deflection current in an inductance, such, for example, as a deflection yoke for a cathode ray tube.

An object of the invention is to provide a circuit of the above type which directly drives a deflection yoke and yet operates from a high voltage-low current power supply rather than a low voltage-high current supply such as is usually employed in direct drive circuits.

Another object is to provide a sweep circuit which is especially suitable for relatively low frequency applications such as slow scan television and the like.

Another object of the invention is to provide an improved transistorized sweep circuit which is light, simple, efficient, and relatively inexpensive.

According to the invention, a current is initially established in an inductive element such as a deflection yoke by connecting it across a power supply. The power supply is then disconnected, whereby the current through the yoke inductance begins to decrease and the voltage across it reverses its polarity. The reversed voltage produces a flow of current in a second path which includes a capacitance. This capacitance forms a tuned circuit with the inductance and current flows in the tuned circuit in the form of a damped sinusoidal wave. A portion of this wave forms the sawtooth trace. A simple circuit controls the linearity of the trace.

In a preferred form of the invention, the second path mentioned above includes a transistor. The emitter and collector of the transistor are connected across the yoke and the collector and base of the transistor are connected across the capacitance. The transistor is so poled that it does not conduct when a current is being established in the yoke but does conduct when this current begins to decrease and the voltage across the yoke reverses. The linearity control includes a circuit for applying a negative bias current to the base of the transistor, and means for adjusting the magnitude of the bias current.

The invention will be described in greater detail by reference to the following description taken in connection with the accompanying drawing in which.

Figure 1:
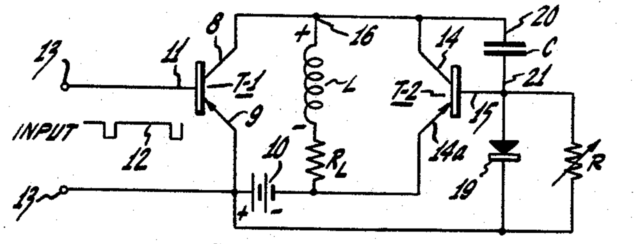
Fig. 1 is a schematic circuit diagram of a preferred form of the invention.

Referring to Fig. 1, the collector 8-to-emitter 9 circuit of transistor T–1 is connected in series with a D.C. power supply, shown as a battery 10. The deflection coil or yoke of a cathode ray tube, shown in the drawing as including an inductive component L and a resistive component $R_L$, is in series with the transistor and battery. In the absence of an input signal, transistor T–1 does not conduct. However, when a negative voltage or current pulse 12 is applied to input terminals 13, a current is induced in the base electrode 11, which is of the correct polarity to render transistor T–1 conductive. Preferably, the amplitude of the pulse 12 is such that transistor T–1 is driven to saturation. In other words, the circuit is such that transistor T–1 acts like a switch, and the latter is closed by the application of pulse 12.

When transistor T–1 is rendered conductive, substantially the entire power supply voltage is applied across the yoke L, $R_L$, and voltage of the polarity indicated develops across inductance L. The current through inductance L is initially zero or nearly zero. However, when transistor T–1 is rendered conductive and the power supply voltage is placed across the inductance, the current through the inductance beings to increase.

Figures 2, 3:
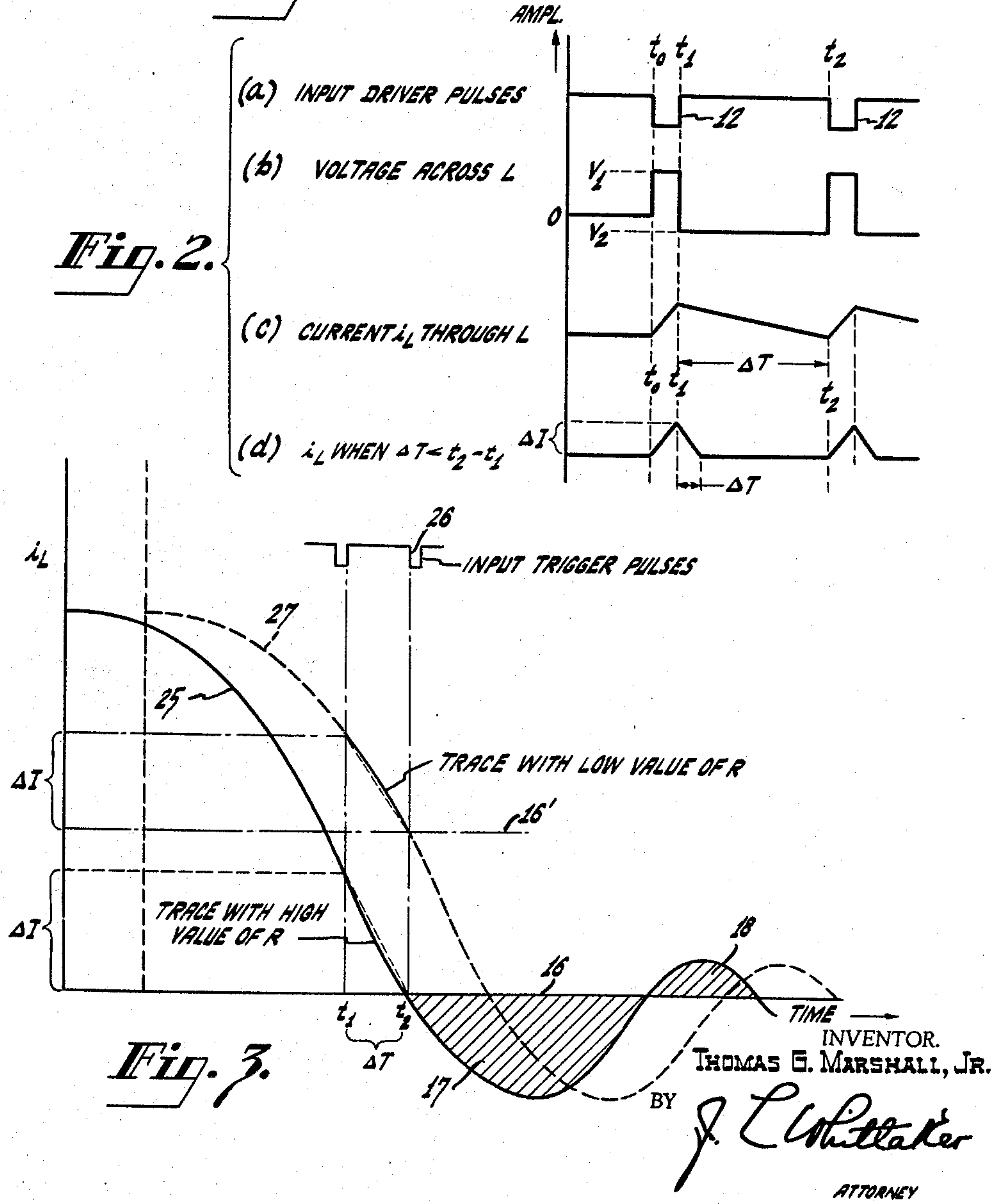
Fig. 2 is a drawing of various waveforms in the circuit of Fig. 1.
Fig. 3 is another drawing to explain the operation of the circuit of Fig. 1.

The operation of the circuit as described so far can be better understood by referring to Fig. 2. Time $t_0$ corresponds to the leading edge of the negative pulse, as shown in Fig. 2*a*. Fig. 2*b* shows that at time $t_0$, substantially the full power supply voltage $V_1$ is applied across L (this assumes that $R_L$ is of relatively low value, as is actually the case). Fig. 2*c* shows that at time $t_0$, the current through the inductance is zero but is beginning to increase.

During the period $t_0$ to $t_1$ the voltage $V_1$ across the inductance remains substantially constant. However, the current through the inductance increases. The time constants of the circuit may be such that the period $t_0$ to $t_1$ is only a small portion of the time required for the current through L to reach a constant value. Accordingly, the current curve during this period may be fairly linear, as shown. This period corresponds to the retrace interval.

At time $t_1$, the voltage at the base electrode is returned to its original value and transistor T–1 is accordingly cut off. The current $i_L$ through the inductance having no path in which to flow now begins to decrease. This means that the sign of $di_L/dt$ changes, and since the voltage across the inductance is $Ldi_L/dt$, it reverses its polarity.

The collector 14-to-emitter 14*a* circuit of transistor T–2 is connected across the yoke L, $R_L$. The polarity of the connections is such that this transistor does not conduct when transistor T–1 conducts. However, when T–1 is cut off and the voltage across L reverses, transistor T–2 is placed in condition to conduct. Note, in this connection, that the voltage across L is now opposite that across $R_L$. But, since $V_L$ is larger than $V_{RL}$, T–2 is in condition to conduct. The reversed voltage is also applied from point 16 on the inductance through capacitor C to the base 15. This drives the base negative and permits the transistor T–2 to conduct.

Figure 4:
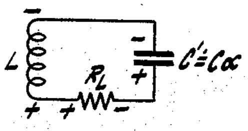
Fig. 4 is a schematic diagram of an equivalent circuit of a portion of the circuit of Fig. 1 during the trace time.

The equivalent circuit during the interval in which transistor T–2 conducts is shown in Fig. 4. Capacitor C, which is connected from the base to collector of the transistor, looks to the inductance like a capacitor of value C′, where $C' \doteq C\alpha$, and $\alpha$=the base to collector current gain of the transistor. The inductance L, capacitor C′, and resistor $R_L$ together form a tuned circuit. The values of the components are such that the resultant response is a damped sinusoid, as shown in Fig. 3.

Referring again to Fig. 2, it is seen that at time $t_1$, the voltage across the inductance suddenly changes from a positive value $V_1$ to a negative value $V_2$, where $V_2 = -I_{Lt_1}R_L$. The current in the inductance, which was increasing up to time $t_1$, now begins to decrease. The time $t_1$ to $t_2$ is the trace interval. During this period, the voltage across the inductance L remains substantially constant, and the current $i_L$ through the inductance decreases. The decrease in current is shown in Fig. 2*c* as being a linear function of time. As a matter of fact, this wave is a portion of a damped sinusoid and, as will be explained more fully later, it can be linear, as shown, or it can be made slightly convex or slightly concave.

Fig. 3 shows in greater detail what occurs in the circuit of Fig. 1 during the trace interval. The free response of this circuit is a damped sinusoid as shown by solid line curve 25, for example. However, since transistor T–2 is in the circuit and it can conduct in only a single direction, the current cannot reverse or take values below the base line. If the base line is the solid line 16, then the cross-hatched portions 17 and 18 of the curve 25 will be absent.

The end of the trace occurs when the current in the inductance, and hence in the emitter-to-collector circuit of transistor T–2, reaches zero provided the trigger pulse doesn't occur first. The base line of the trace, which corresponds in this case to the condition for zero current both in transistor T–2 and in the inductance, can be effectively moved up from line 16 by variation of the linearity control R. The reason for this is that the linearity control provides a current bias to transistor T–2 in a direction to decrease its emitter-to-collector current and a decrease in this current corresponds to a position higher on the free response curve. The shape of the free response curve is unaffected by this additional current. The latter is merely superimposed on the free response, changing only the zero current reference or base line.

The place on the free response where the trace starts is always a constant increment of current $\Delta I_L$ higher than where the trace ends. $\Delta I_L$ is a constant because the change in current during the trace period must equal the change in current during retrace period, and the latter is solely a function of the battery voltage, the retrace time, and the values of inductance, and resistance $R_L$, all of which remain constant, and none of which are affected by changes in the linearity control.

Since $\Delta I_L$ is a constant, one would think that the trace time, ΔT would vary with changes in trace linearity. As can be seen from Fig. 3, in general, the higher up one is on the response characteristic, the greater ΔT for a given $\Delta I_L$. This change in ΔT is, in fact, observable when the period $t_2-t_1$ is greater than ΔT (see Fig. 2*d*). If, on the other hand, the trace time ΔT is shortened so that the trigger pulses occur before $i_L$ reaches zero, then $\Delta I_L$ trace momentarily does not equal $\Delta I_L$ retrace. In this case, the average current level increases over a period of several cycles, the energy stored in L is therefore increased, and hence the amplitude of the free response curve builds up asymptotically to a point such that ΔI trace again equals ΔI retrace. The average current level then remains constant at this new level. ΔT remains fixed and is equal to $t_2-t_1$.

The mode of operation described above is illustrated in Fig. 3. Solid line curve 25 is the free response characteristic. Solid line 16 is the base line. Assuming a relatively high value of R, which means a relatively low value of bias current, and also assuming that the leading edge 26 of a triggering pulse occurs at time $t_2$, it is seen that at time $t_2$ the current in the circuit is zero or some other fixed value. ΔT, or the trace interval, is fixed and corresponds to a change in current ΔI. It will be noted that since the trace occurs near the lower end of the response curve, it is slightly concave.

If the value of R is decreased, thereby increasing the reverse bias current and decreasing the current in the collector-to-emitter circuit of transistor T–2, the base line is effectively moved from line 16 to line 16'. In other words, it is as if the free response curve were shifted from 25 to 27. Curve 27 is almost identical to curve 25. Line 16' corresponds to the same value of current through transistor T–2 as line 16 and it should therefore be superimposed on line 16. In other words, curve 27 should be moved down to a point such that 16' lies on 16. However, for the sake of drawing clarity, line 16' is shown displaced from line 16. ΔI trace remains fixed as does ΔT. Note that the linearity of the trace has changed from being slightly concave to being slightly convex in view of the fact that a different portion of the free response curve is utilized for the trace. R can be varied to adjust the sweep linearity from its concave shape, to a substantially linear shape, to a slightly convex shape.

In view of the fact that the linearity of the trace has changed when going from curve 25 to curve 27 and the further fact that ΔT is a constant, if curve 27 were exactly identical to curve 25, the ΔI of the two traces would not necessarily be equal. However, as ΔI trace must always equal ΔI retrace, which is constant, there will be an adjustment in the magnitude of the free response 27, if necessary, such that ΔI trace for curve 27=$\Delta I$ trace for curve 25=$\Delta I$ retrace.

When the conditions are such that ΔT, the trace period, is less than the period between $t_1$ and $t_2$, the resultant wave is as shown in Fig. 2*d*. As in the previous discussion, ΔI remains constant regardless of change in R. However, ΔT may vary slightly due to changes in the trace linearity. This type of wave is useful in radar applications.

At the time transistor T–1 is turned on again there may still be some charge remaining in condenser C. This charge should be dissipated so that the trace begins at the same point each cycle. This is accomplished, according to the present invention, for example, by connecting a diode 19 to the condenser. The anode of the diode is connected to the terminal of the condenser which is connected to the base, and its cathode is connected to the emitter of T–1. When transistor T–1 is again rendered conductive, the diode is shunted across the condenser through T–1. The diode is poled so that the condenser may discharge through it. This discharge circuit is isolated from the remainder of the circuit because both collector and emitter junctions of T–2 are non-conducting during retrace interval. When T–1 is again turned off and T–2 is turned on, the diode has essentially the total battery voltage applied across it in the reverse conducting direction via the base-to-emitter circuit of T–2, and is accordingly inoperative during trace.

In a practical circuit, typical values of circuit elements are as follows: The deflection coil may be a medium impedance vertical deflection yoke having an inductance of about 50 millihenries and a resistance of about 50 ohms. Transistor T–2 may have an α of about 75. Condenser C may be .08 microfarad; resistor R may be 100,000 ohms. The voltage source used may be about 30 volts in order to avoid breakdown problems, if low breakdown voltage transistors are employed. With transistors designed to withstand higher voltages, the power supply voltage can be and preferably is substantially higher to provide faster retrace times. T–1 may be a transistor, as shown, or any other type of switch such as a triode, for example, or even a mechanical switch.

The $$\frac{L}{R_L}$$

ratio of the yoke must equal or evceed the trace time for a linear trace to occur. A linear trace implies a specific $$\frac{di_L}{dt}$$

which is constant and is equal to $$\frac{\Delta I}{\Delta T}$$

As a result of this, a voltage will occur across the inductance equal to $$L\frac{\Delta I_L}{\Delta T}$$

This voltage opposes the $i_L R_L$ drop in the yoke, which is equal to $(\Delta I_L + i_{L\ min})R_L$ at the start of trace, and must equal or exceed it for a negative voltage to be applied to T–2. Therefore, $$L\frac{\Delta I}{\Delta T} \geq (\Delta I + i_{L\ min})R_L$$

or $$\frac{L}{R_L}\frac{\Delta I_L}{(\Delta I_L + i_{L\ min})} \geq \Delta T$$

For $i_{L\ min}=0$, $$\frac{L}{R_L}$$

must equal or exceed ΔT as initially stated.

In the practical circuit discussed above, $$\frac{L}{R_L}$$

is approximately 0.001 so that the lowest frequency at which the circuit should be used with this yoke is about 1,000 cycles. The upper frequency at which the circuti should be used is limited mainly by the breakdown characteristics of the switch T–1. In the practical circuit discussed, this limit was about 10 kilocycles. These frequencies are illustrative only and will vary in accordance with the values of components used.

In the foregoing discussion, a square pulse is shown as the trigger pulse. It should be appreciated that the shape of this pulse is not critical. Its only function is to turn the transistor T–1 on and off and its shape can be slightly rounded or even sawtooth.

Various parameters of the sawtooth wave produced by the circuit above can easily be controlled. The linearity control has already been described. The amplitude of the trace can be controlled either by adjusting the retrace interval (the width of the negative triggering pulses) or the power supply voltage (battery 10). The sweep duration ΔT can be controlled by changing the value of C (thereby changing the frequency of the damped sinusoid). These additional means for control are not illustrated.

What is claimed is:

1. A circuit for producing a deflection current in a deflection yoke comprising a switch; connections for a source of voltage connected in series with said switch and said yoke; means for closing said switch, whereby said voltage is applied across said yoke and current begins to increase in said yoke, and then opening said switch, whereby the voltage across said yoke changes its polarity; a transistor which is cut off when said switch is closed having a base, an emitter, and a collector, said collector and emitter being effectively connected across said yoke in a sense to permit the transistor to conduct upon said voltage reversal; and a capacitor connected between the base and collector of said transistor.

2. A circuit for producing a sawtooth current in an inductance comprising a switch; connections for a source of voltage connected in series with said switch and said inductance; means for closing said switch, whereby said voltage is applied across said inductance and current begins to increase in said inductance, and then opening said switch, whereby the voltage across said inductance changes its polarity; a transistor having a base, an emitter, and a collector, said collector and emitter being effectively connected across said inductance in a sense to permit the transistor to conduct upon said voltage reversal; a capacitor connected between the base and collector of said transistor; and means for discharging said capacitor after a predetermined interval of time.

3. A circuit for producing a sawtooth current in an inductance comprising a switch; connections for a source of voltage connected in series with said switch and said inductance; means for closing said switch, whereby said voltage is applied across said inductance and current begins to increase in said inductance, and then opening said switch, whereby the voltage across said inductance changes its polarity; a transistor having a base, an emitter, and a collector, said collector and emitter being effectively connected across said inductance in a sense to permit the transistor to conduct upon said voltage reversal; a capacitor connected between the base and collector of said transistor; means continuously applying a reverse biasing current to said base; and means for adjusting said biasing current.

4. A circuit for producing a sawtooth current in an inductance comprising, in combination, a source of direct voltage; means for connecting said source across said inductance and thereby inducing current in said inductance; a transistor having a base, emitter and collector, said emitter and collector being connected across said inductance in such polarity that when said source is connected across said inductance, no current tends to flow through said transistor; a capacitor connected between the base and collector of said transistor; means for disconnecting said source from said inductance after a predetermined interval of time; means continuously applying a reverse biasing current to said base; and means for adjusting said biasing current.

5. A circuit for producing a deflection current in an inductance comprising, in combination, means for applying a voltage across said inductance and thereby inducing a current therein; means for disconnecting said voltage from across said inductance and simultaneously effectively connecting a capacitance across said inductance, whereby said inductance and capacitance form a tuned circuit through which a sinusoidal-like current tends to flow; means in said tuned circuit for effectively opening the latter when the curernt flow therein reaches a predetermined value; and means for adjusting the point along the sinusoidal-like current wave at which the current flow in said tuned circuit reaches said predetermined value.

6. A circuit for producing a sawtooth current in an inductance comprising, in combination, a direct voltage source; means for connecting said source across said inductance and thereby inducing a current therein; means for disconnecting said voltage source from said inductance and simultaneously effectively connecting a capacitance across said inductance, whereby said inductance and capacitance form a tuned circuit through which a sinusoidal-like current tends to flow; means in said tuned circuit for effectively opening the latter when the current flow therein reaches zero; and means for adjusting the point along the sinusoidal-like current wave at which the current flow in said tuned circuit reaches zero.

7. A circuit for producing a sawtooth current in an inductance comprising, in combination, a source of direct voltage; a switch in series with said source and said inductance; a transistor having a base, emitter and collector, said emitter and collector being connected across said inductance in such polarity that no current tends to flow through said transistor when said switch is closed; a capacitor connected between the base and collector of said transistor; and means for closing and then opening said switch.

8. A circuit as set forth in claim 7 in which said switch comprises a transistor.

9. A circuit as set forth in claim 7, and further including an adjustable bias current source connected to said base.

10. A circuit for producing a sawtooth current in an inductance comprising, in combination, a source of direct voltage; a switch in series with said source and said inductance; a transistor having a base, emitter and collector, said emitter and collector being connected across said inductance in such polarity that no current tends to flow through said transistor when said switch is closed; a capacitor connected between the base and collector of said transistor; means for closing and then opening said switch; and means connected to said capacitor for discharging the same during the time said switch is closed.

11. A circuit as set forth in claim 10 in which the last-named means comprises a diode connected in series with the switch and capacitor and poled to conduct when the switch is closed.

12. A generator for producing a sawtooth current in a deflection yoke comprising means producing the retrace portion of the current wave including a switch and a source of direct voltage connected in series with the yoke, and means for closing and opening the switch; and means for producing the trace portion of the current wave including a transistor the collector and emitter of which are connected across said yoke in a direction to permit current flow through the transistor when said switch is open.

13. A generator as set forth in claim 12, further including means for adjusting the linearity of said sawtooth current comprising means applying a controllable reverse bias current to the base of said transistor.

14. A generator as set forth in claim 12, further including a lumped capacitor connected between the base and collector of said transistor.

References Cited in the file of this patent

UNITED STATES PATENTS

| | | |
|---|---|---|
| 2,084,157 | McLennan | June 15, 1937 |
| 2,363,822 | Wendt | Nov. 28, 1944 |
| 2,747,136 | Herzog | May 22, 1956 |

OTHER REFERENCES

Guggi: C.R.T. Deflection Circuit Has High Efficiency," Electronics, April 1, 1957, pages 172 to 175.